(12) United States Patent
Pregitzer et al.

(10) Patent No.: US 9,332,613 B2
(45) Date of Patent: May 3, 2016

(54) CURRENT LIMITER WITH ACTIVE DAMPING

(71) Applicant: Power Integrations, Inc., San Jose, CA (US)

(72) Inventors: Ricardo L. J. Pregitzer, Palo Alto, CA (US); Jose R. Del Carmen, Jr., San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 334 days.

(21) Appl. No.: 14/106,607

(22) Filed: Dec. 13, 2013

(65) Prior Publication Data

US 2014/0265861 A1 Sep. 18, 2014

Related U.S. Application Data

(60) Provisional application No. 61/785,610, filed on Mar. 14, 2013.

(51) Int. Cl.
| | |
|---|---|
| *H05B 37/00* | (2006.01) |
| *H05B 33/08* | (2006.01) |
| *H02H 9/04* | (2006.01) |

(52) U.S. Cl.
CPC .............. *H05B 33/089* (2013.01); *H02H 9/04* (2013.01); *H05B 33/0887* (2013.01)

(58) Field of Classification Search
CPC ................................ H05B 37/02; H05B 37/00
See application file for complete search history.

(56) References Cited

U.S. PATENT DOCUMENTS 8,598,792 B2 * 12/2013 Ren .................... H05B 33/0815
315/119

* cited by examiner

*Primary Examiner* — Hai L Nguyen
(74) *Attorney, Agent, or Firm* — Blakely Sokoloff Taylor & Zafman LLP (57) ABSTRACT

This relates to a current limiter circuit that can be used in a power conversion system having a triac dimmer. In one example, the power conversion system may be used in an off-line LED driver. The current limiter circuit may be coupled to a power converter of the power conversion system and may operate to reduce the current that the power converter receives from an input line in the event of a power line surge. The current limiter circuit may also be coupled to the triac dimmer and may also operate as a damper for a portion of the half line cycle. The current limiter circuit may dampen the ringing in the triac current for a portion of the half line cycle and may cease dampening for the remaining portion of the half line cycle.

24 Claims, 6 Drawing Sheets

CURRENT LIMITER WITH ACTIVE DAMPING

BACKGROUND

1. Field

The present disclosure relates generally to a power conversion system and, more specifically, to a current limiter circuit that can be used in a power conversion system having a triac dimmer.

2. Discussion of the Related Art

Many electronic devices, such as cell phones, laptop computers, etc., use direct current (dc) power to operate. Conventional wall outlets generally deliver a high-voltage alternating current (ac) power that needs to be transformed to dc power in order to be used as a power source by most electronic devices. In a switch mode power converter, also referred to as a switch mode power supply, a switch is used to provide a desired dc power by either switching at a variable duty ratio (typically the ratio of on-time of the switch to total switching period) or by varying the number of ON and OFF cycles per unit time. A switch mode power converter may also employ a controller to provide output regulation by sensing the output and controlling the switch of the power converter in a closed loop. Switch mode power converters are commonly used due to their high efficiency, small size, and the safety and protection features that are provided. One important safety consideration for a switch mode power converter is the protection against power line surges that may damage the power converter and/or the sensitive load(s) coupled to the output of the power converter. This type of protection may be referred to as surge protection.

Switch mode power converters have recently found wide use in applications involving high-efficiency light sources. Example applications include electronic ballasts for fluorescent or other discharge lamps, light-emitting diode (LED) drivers (e.g., power conversion systems that provide regulated power to LED lamps), etc. LEDs have become popular due to their longer life and their recent performance improvement in light spectrum (e.g., color), Volt-Ampere characteristics, and Lumens per Watt delivery. As such, safe and efficient LED drivers have recently received considerable attention in the lighting industry. LED drivers that include switch mode power converters, which may also be referred to as off-line LED drivers, may be exposed to power line surges due to lightning or other interruptions. Therefore, it may be desired for an off-line LED driver to provide a surge protection feature.

Some lighting applications include a feature that allows the user to control the brightness of a lighting device. Specifically, in lighting applications, reducing the brightness of the lighting device may be referred to as dimming and may be accomplished by limiting the power supplied to the lighting device. In one example, dimming can be realized by implementing phase dimming, where a portion of the ac input voltage, also referred to as an ac line signal, is blocked from being received by the lighting device. This reduces the amount of power delivered to the lighting device, thereby reducing the brightness of the device. In phase dimming, the portion of the input voltage that is blocked can be measured by a phase angle that represents a portion of a period of the input voltage measured in degrees. One period may be defined as one complete line cycle and may correspond to 360 degrees. Similarly, half of the period of the input voltage may be referred to as a half line cycle and may correspond to 180 degrees.

One device that may be used to implement phase dimming in a lighting system is a triac dimmer. Specifically, a triac may include a semiconductor component that behaves as a switch used to block a portion of the input voltage from the input of the power converter. In operation, when the triac is disengaged (turned off), the ac line signal is blocked from the input of the power converter and the current to the power converter is substantially restricted. Conversely, when the triac is engaged (turned on), the ac line signal is unblocked from the input of the power converter and the current is permitted to conduct to the power converter. The triac may remain engaged and continue to conduct current until the current in the triac drops below a threshold value commonly known as a holding current.

Implementing phase dimming in an off-line LED driver with a triac dimmer may prove challenging for several reasons, with the triac itself being one of them. For example, when the triac fires (e.g., turns on) during each half cycle of the input voltage, the voltage across the switch suddenly increases (typically, in the form of a spike) leading to ringing in the triac current, which may ultimately cause the triac to misfire. Specifically, because of the ringing, the triac may conduct insufficient current (less than the holding current) to remain engaged and may prematurely turn off. Triac misfires usually happen at different times in consecutive input voltage cycles and, as such, energy delivered to the LED lamp varies from one cycle to another. This may result in a perceivable fluctuation of light output by the LED lamp (e.g., flickering in the LED lamp). As a remedy, a resistor may be used in series with the triac dimmer as a damper to dampen the ringing in the triac current. However, use of the resistor alone may lower the overall efficiency of the off-line LED driver.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example" means that a particular feature, structure, or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it should be appreciated that the figures provided herewith are for explanation purposes to persons ordinarily skilled in the art and that the drawings are not necessarily drawn to scale.

To provide a thorough understanding of the present disclosure, in some examples, numerous specific details are set forth and, in some cases, simplified equivalent implementation circuits have been described. However, it will be apparent to one having ordinary skill in the art that the equivalent simplified circuits may differ from the actual implementations and that all specific details need not be employed to practice the various examples.

Additionally, it should be appreciated that in the description below and in all described examples, a switched mode power supply may include a controller incorporated into an integrated circuit (IC) having some or none of the switching and power components in a monolithic or hybrid structure.

Various examples are described below relating to a current limiter circuit that can be used in a power conversion system having a triac dimmer. In one example, the power conversion system may be used in an off-line LED driver. The current limiter circuit may be coupled to a power converter of the power conversion system and may operate to reduce the current that the power converter receives from an input line in the event of a power line surge. The current limiter circuit may also be coupled to the triac dimmer and may also operate as a damper for a portion of the half line cycle. In other words, the current limiter circuit may dampen the ringing in the triac current for a portion of the half line cycle and may cease dampening for the remaining portion of the half line cycle. By dampening the triac current for a portion of the half line cycle instead of the entire half line cycle, the current limiter circuit may consume less current and, therefore, improve the overall efficiency of the power conversion system.

Figure 1:
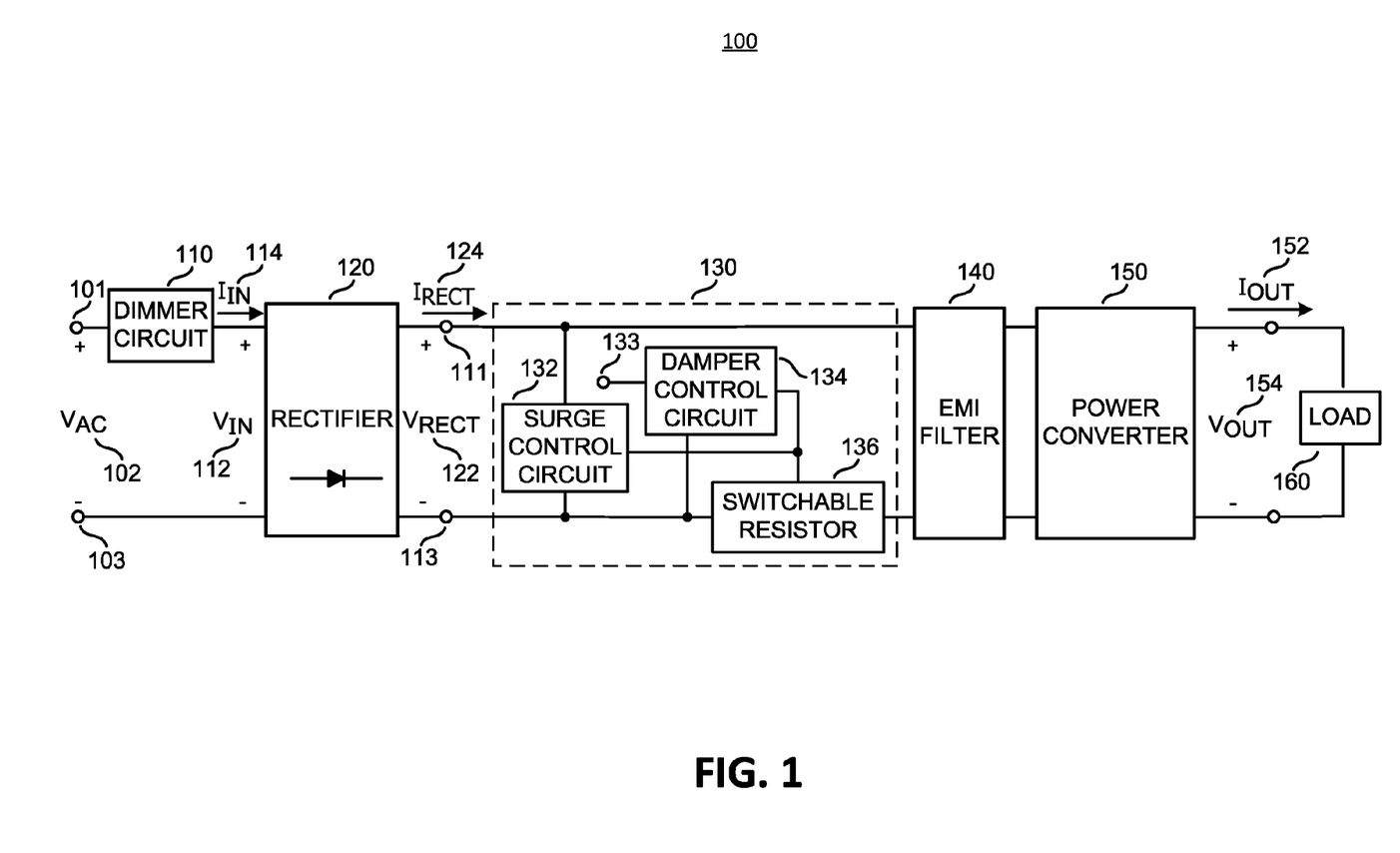
FIG. 1 shows a functional block diagram of an example power conversion system including a current limiter circuit.

FIG. 1 illustrates a functional block diagram of an example power conversion system 100 having a current limiter circuit 130. The illustrated power conversion system 100 may generally include a dimmer circuit 110, a rectifier 120, a current limiter circuit 130, an electromagnetic interference (EMI) filter 140, a power converter 150, also referred to as a power supply, and a load 160.

Power conversion system 100 may provide output power to load 160 from an unregulated ac line voltage $V_{AC}$ 102, also referred to as a line signal. In the illustrated example, line voltage $V_{AC}$ 102 includes a periodic ac line voltage applied between terminals 101 and 103. As shown, dimmer circuit 110 may be coupled to receive line voltage $V_{AC}$ 102 and generate an input current $I_{IN}$ 114 at its output and an input voltage $V_{IN}$ 112 between its output and terminal 103. In one example, dimmer circuit 110 may include a dimmer that blocks a portion of the leading edge of line voltage $V_{AC}$ 102 from the input of power converter 150. However, it is appreciated that either a trailing edge or leading edge dimmer may be used in dimmer circuit 110 to block a portion of line voltage $V_{AC}$ 102 from the input of power converter 150. Accordingly, input voltage $V_{IN}$ 112 may also be referred to as a truncated line voltage. In operation, dimmer circuit 110 may limit the amount of power delivered to power converter 150, thereby lowering the current delivered to load 160. Thus, when load 160 includes an array of LEDs, dimmer circuit 110 may be used to reduce the total light output by the array of LEDs.

In some examples, dimmer circuit 110 may include a triac dimmer. In these examples, input voltage $V_{IN}$ 112 may represent the output voltage of the triac and input current $I_{IN}$ 114 may represent the current in the triac (e.g., the triac current). The triac may include a semiconductor component that behaves as a switch used to block a portion of the line voltage from the input of power converter 150. In operation, when the triac is disengaged (turned off), line voltage $V_{AC}$ 102 is blocked from the input of power converter 150 and current to power converter 150 is substantially restricted. Conversely, when the triac is engaged (turned on), ac line voltage $V_{AC}$ 102 is unblocked from the input of power converter 150 and current is again permitted to conduct to power converter 150.

In other examples, dimmer circuit 110 may include one of many known semiconductor switches, such as a metal oxide semiconductor field effect transistor (MOSFET). In these examples, dimmer circuit 110 may switch off (e.g., the switch may transition to the OFF state) and block line voltage $V_{AC}$ 102 from power converter 150 for a portion of the beginning of each half line cycle. After a certain amount of time, dimmer circuit 110 may switch on (e.g., the switch may transition to the ON state) and unblock line voltage $V_{AC}$ 102 from power converter 150.

In general, the portion of the line voltage $V_{AC}$ 102 that is blocked from power converter 150 may be related to the amount of dimming desired. For example, the larger the blocked portion of the line voltage, the more pronounced the dimming effect. In lighting applications that use a triac to reduce the total light output, the triac may require a minimum amount of current, also referred to as a holding current, to remain engaged. Power conversion system 100 may use current limiter circuit 130 to ensure that the triac current does not drop below the holding current.

As further shown in FIG. 1, dimmer circuit 110 may be coupled to rectifier 120, which, in one example, may include a full bridge rectifier. However, it should be appreciated that other known rectifier circuits may be used. Rectifier 120 may be coupled to receive input voltage $V_{IN}$ 112 and input current $I_{IN}$ 114. In response, rectifier 120 may generate rectified voltage $V_{RECT}$ 122 between terminals 111 and 113 and may output rectified current $I_{RECT}$ 124 to terminal 111. In other words, rectified voltage $V_{RECT}$ 122 may correspond to the rectified version of input voltage $V_{IN}$ 112 and rectified current $I_{RECT}$ 124 may correspond to the rectified version of input current $I_{IN}$ 114.

In the depicted example, an input of current limiter circuit 130, which may also be referred to as a limiter input, is coupled to rectifier 120 at terminals 111 and 113 and an output of current limiter circuit 130, which may also be referred to as a limiter output, is coupled to power converter 150 through EMI filter 140. In one example, EMI filter 140 may include one or more filters made up of inductors and capacitors. In operation, current limiter circuit 130 may reduce the voltage (and hence, the current) across power converter 150 by varying an impedance that is coupled between the limiter input and the limiter output (e.g., to power converter 150) based on rectified voltage $V_{RECT}$ 122 and therefore may act as a protection circuit during a power line surge. Specifically, current limiter circuit 130 includes a surge control circuit 132 coupled to the limiter input and a variable impedance circuit (e.g., switchable resistor circuit 136) coupled between the limiter input and power converter 150. Surge control circuit 132 may be coupled to receive rectified voltage $V_{RECT}$ 122 to determine whether rectified voltage $V_{RECT}$ 122 has reached a surge threshold, which may be indicative of a surge in line voltage $V_{AC}$ 102. Surge control circuit 132 may be further coupled to the input of switchable resistor circuit 136 and may adjust the signal at the input of switchable resistor circuit 136 (e.g., a control signal) to change the impedance of switchable resistor circuit 136 (e.g., an impedance between the limiter input and power converter 150) from a lower value to a higher value in response to determining that rectified voltage $V_{RECT}$ 122 has reached the surge threshold. In one example, switchable resistor circuit 136 may include an impedance element, such as a resistor, and a switch coupled across the impedance element that can be turned on or off to change the impedance of switchable resistor circuit 136 in response to the control signal. For example, the impedance of switchable resistor circuit 136 may be a lower value, such as zero Ohms, when the control signal is not below a control threshold and the switch is turned on, and may be a higher value when the control signal is below the control threshold and the switch is turned off (or vice versa). In one example, the switch can be one of many known semiconductor switches, such as MOSFET, insulated-gate bipolar transistor (IGBT), etc.

Furthermore, current limiter circuit 130 may act as a damper to reduce the ringing in the input current $I_{IN}$ 114 when dimmer circuit 110 switches on. As mentioned above, when dimmer circuit 110 switches on, the triac current may start ringing, that is, reversing multiple times during the half line cycle. During these reversals, the triac current may drop below the holding current and cause dimmer circuit 110 to prematurely turn off, resulting in fluctuation of the light output. Current limiter circuit 130 may include a damper control circuit 134 coupled to the limiter input for dampening input current $I_{IN}$ 114 for a certain length of time after dimmer circuit 130 switches on and for stopping the dampening of input current $I_{IN}$ 114 for the remainder of the half line cycle. In other words, damper control circuit 134 may dampen input current $I_{IN}$ 114 for a duration of time that is less than the entire half line cycle. In one example, an input terminal 133 of damper control circuit 134 may be coupled to terminal 111 and damper control circuit 134 may be coupled to receive rectified voltage $V_{RECT}$ 122 to determine whether rectified voltage $V_{RECT}$ 122 has reached a damper threshold, which may indicate that current limiter circuit 130 should stop dampening input current $I_{IN}$ 114. In another example, input terminal 133 may be coupled to one of the internal nodes of EMI filter 140 and damper control circuit 134 may be coupled to receive a signal representative of rectified voltage $V_{RECT}$ 122 to determine whether the signal has reached the damper threshold. Damper control circuit 134 may be further coupled to the input of switchable resistor circuit 136 and can adjust the control signal to change the impedance between the limiter input and power converter 150 to a higher value to dampen input current $I_{IN}$ 114 for a portion of the half cycle of the line voltage $V_{AC}$ 102. Damper control circuitry 134 may further adjust the control signal to change the impedance to a lower value to stop dampening input current $I_{IN}$ 114 in response to determining that rectified voltage $V_{RECT}$ 122 or the signal representative of rectified voltage $V_{RECT}$ 122 has reached the damper threshold.

In power conversion system 100, power converter 150 may produce an output voltage $V_{OUT}$ 154 and output current $I_{OUT}$ 152 across load 160. In one example, power converter 150 may also regulate an output quantity across load 160. The output quantity regulated across load 160 may be the output voltage $V_{OUT}$ 154, the output current $I_{OUT}$ 152, or combination thereof.

Figure 2A:
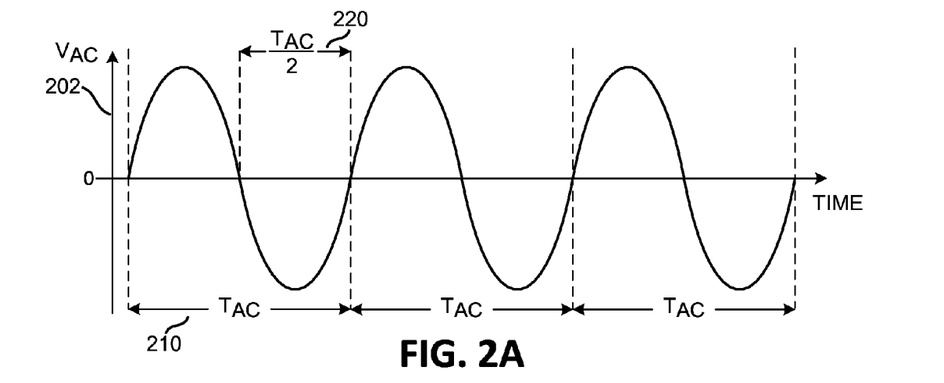
FIG. 2A shows an example waveform that corresponds to a line voltage of the example power conversion system of FIG. 1.
Figure 2B:
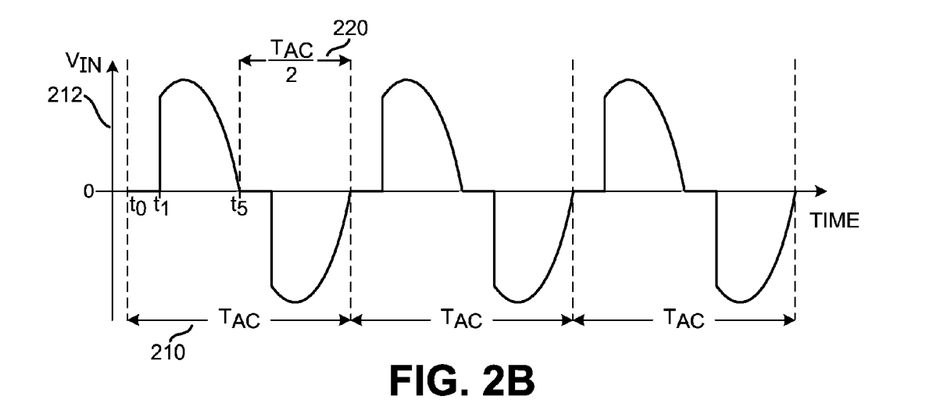
FIG. 2B shows an example waveform that corresponds to an output voltage of a dimmer circuit of the example power conversion system of FIG. 1.
Figure 2C:
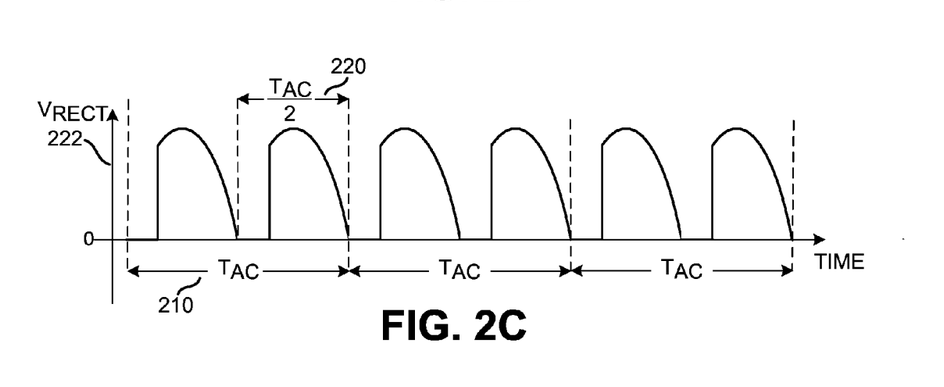
FIG. 2C shows an example waveform that corresponds to a rectified output voltage of a dimmer circuit of the example power conversion system of FIG. 1.

FIGS. 2A-C show example waveforms that may be associated with various voltage signals of power conversion system 100. Waveform 202 is one example representation of line voltage $V_{AC}$ 102. As shown, waveform 202 is a sinusoidal waveform with a period $T_{AC}$ 210, which may also be referred to as a full line cycle. Similarly, half of period $T_{AC}$ 210 ($T_{AC}/2$ 220) may be referred to as a half line cycle. Waveform 212 is one possible representation of input voltage $V_{IN}$ 112 that may correspond to the output voltage of dimmer circuit 110. As previously noted, dimmer circuit 110 may block line voltage $V_{AC}$ 102 for a portion of the beginning of the half line cycle from power converter 150 to limit the amount of power delivered to load 160. For example, in the half line cycle of waveform 212 between time $t_0$ and time $t_5$, the portion of the waveform 212 between time $t_0$ and time $t_1$ is substantially zero volts due to dimmer circuit 110 blocking line voltage $V_{AC}$ 102. For the remaining portion of the half line cycle between time $t_1$ and time $t_5$, dimmer circuit 110 unblocks line voltage $V_{AC}$ 102 and, as shown, waveform 212 (e.g., input voltage $V_{IN}$ 112) substantially follows waveform 202 (e.g., line voltage $V_{AC}$ 102). Waveform 222 is one possible representation of rectified voltage $V_{RECT}$ 122 generated by rectifier 120. As depicted, waveform 222 is similar to waveform 212 except that portions of waveform 212 that are below zero volts (e.g., negative) are rectified to positive voltages of equal magnitude. In other words, $V_{RECT}=|V_{IN}|$.

Figure 3A:
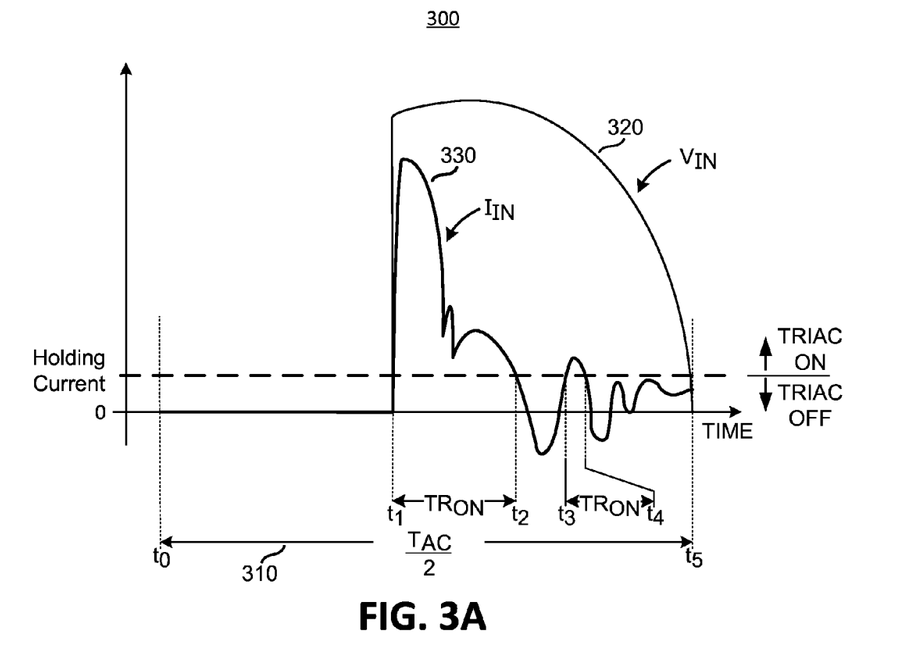
FIG. 3A shows one example set of waveforms that correspond to the voltage and current signals at the output of a dimmer circuit that can be used in the example power conversion system of FIG. 1.

FIG. 3A shows one example set of waveforms 300 for voltage and current signals at the output of a dimmer circuit including a triac dimmer that can be used in power conversion system 100. In one example, these waveforms may be representative of the voltage and current signals at the output of dimmer circuit 110 when current limiter circuit 130 is not operating to dampen input current $I_{IN}$ 114. Waveform 320 corresponds to one example representation of one half cycle of input voltage $V_{IN}$ 112, and waveform 330 corresponds to one example representation of one half cycle of input current $I_{IN}$ 114 (e.g., the triac current). Period 310 is representative of one half line cycle ($T_{AC}/2$). As shown, dimmer circuit 110 is switched off (e.g., disengaged) and not conducting current at the beginning of period 310 between time $t_0$ and time $t_1$. Thus, the portion of waveform 320 between time $t_0$ and time $t_1$ is substantially zero volts as dimmer circuit 110 blocks line voltage $V_{AC}$ 102. At time $t_1$, dimmer circuit 110 is switched on (e.g., engaged) and starts conducting current. Dimmer circuit 110 may remain engaged, unblocking line voltage $V_{AC}$ 102 until time $t_5$ as long as the triac current stays above the holding current. As such, in an ideal case with the triac of dimmer circuit 110 remaining on throughout the time period between time $t_1$ and time $t_5$, waveform 320 substantially follows line voltage $V_{AC}$ 102 as shown in FIG. 3A. However, as previously mentioned, when dimmer circuit 110 switches on, waveform 320 may suddenly rise from zero volts, causing ringing in the triac current as shown by waveform 330. Without current limiter circuit 130 dampening the triac current, the resulting ringing may cause the triac current to drop below the holding current and turn off the triac (and thus, disengage dimmer circuit 110), which may then force input voltage $V_{IN}$ 112 represented by waveform 320 to become zero volts. As a result, power converter 150 may deliver less power to load 160 than desired and the light output by load 160 may fluctuate. In the illustrated example of FIG. 3A, waveform 330 is above the holding current between time $t_1$ and time $t_2$ and between time $t_3$ and time $t_4$ (also referred to as triac conduction periods $TR_{ON}$), during which the triac is on and conducting current and during which waveform 320 follows line voltage $V_{AC}$ 102. During other times (e.g., between time $t_2$ and time $t_3$ and between time $t_4$ and time $t_5$), input current $I_{IN}$ 114 represented by waveform 330 goes below the holding current, causing the triac to turn off and input voltage $V_{IN}$ 112 represented by waveform 320 to drop to zero volts (not shown).

Figure 3B:
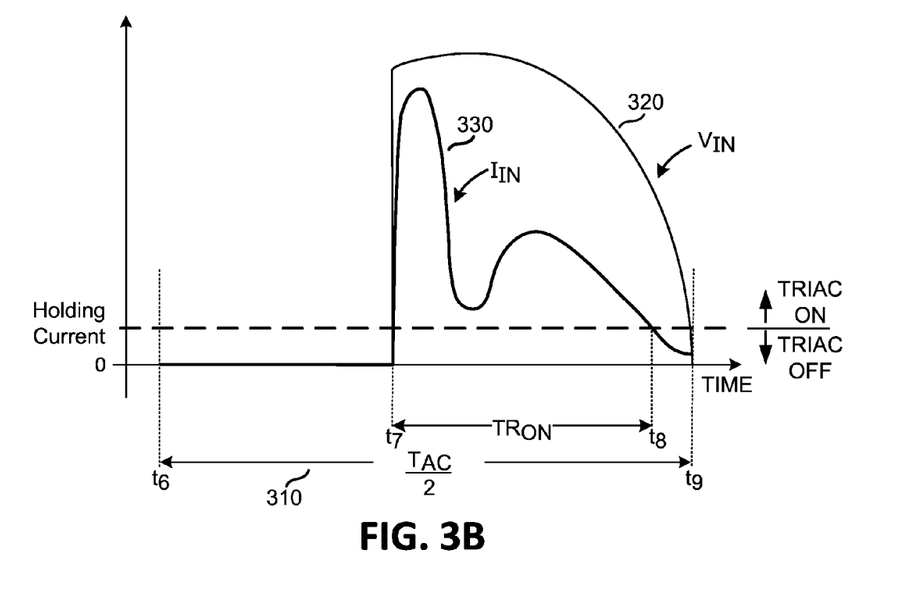
FIG. 3B shows another example set of waveforms that correspond to the voltage and current signals at the output of the dimmer circuit that can be used in the example power conversion system of FIG. 1.

FIG. 3B shows another example set of waveforms for voltage and current signals at the output of the dimmer circuit. Waveforms 320 and 330 in FIG. 3B are similar to those illustrated in FIG. 3A, except that these waveforms are representative of the voltage and current signals at the output of dimmer circuit 110 when current limiter circuit 130 is operating to dampen input current $I_{IN}$ 114 for a certain period of time after dimmer circuit 110 switches on. As shown, with current limiter circuit 130 dampening the triac current after dimmer circuit 110 switches on at time $t_7$, the ringing in triac current does not cause triac current to drop below the holding current until time $t_8$, which is closer to the end of period 310 than time $t_2$ is to the end of period 310. As a result, the triac remains on and conducts current, causing input voltage $V_{IN}$ 112 represented by waveform 320 to follow line voltage $V_{AC}$ 102 for a longer length of time (e.g., between time $t_7$ and time $t_8$). It should be noted that despite the dampening of the triac current provided by current limiter circuit 130, waveform 330 may still drop below the holding current before the half line cycle is over. Since the triac turns off and waveform 320 drops to substantially zero volts during this time (between time $t_8$ and time $t_9$, not shown), the power delivered by power converter 150 to load 160 may be less than the maximum achievable amount of power in a half line cycle. However, the difference may be small enough that the light output by load 160 may not visibly fluctuate. In other words, by dampening the triac current for a certain length of time after dimmer circuit 110 switches on, current limiter circuit 130 may help power conversion system 100 maintain a steady light output during dimming.

Figure 4:
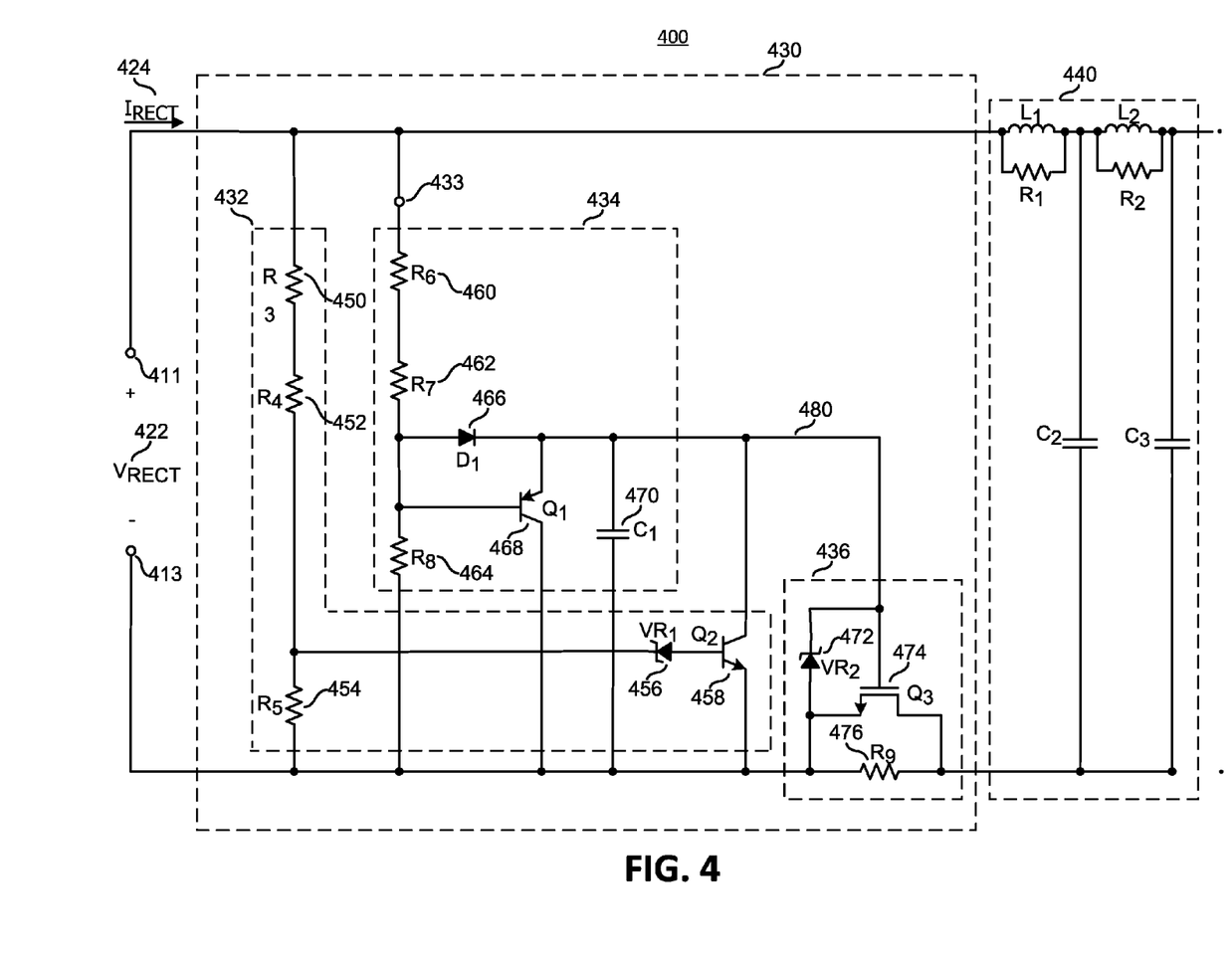
FIG. 4 shows a circuit diagram illustrating an example current limiter circuit.

FIG. 4 shows a circuit diagram 400 illustrating an example current limiter circuit 430 that can be used in power conversion system 100. In the illustrated example, the input of current limiter circuit 430 (e.g., the limiter input) may be coupled to terminals 411 and 413, and the output of current limiter circuit 430 (e.g., the limiter output) may be coupled to a power converter (not shown). As shown, current limiter circuit 430 may be coupled to receive a rectified voltage $V_{RECT}$ 422 across terminals 411 and 413. In one example, current limiter circuit 430 may correspond to current limiter circuit 130. As such, terminals 411 and 413 may correspond to terminals 111 and 113, rectified voltage $V_{RECT}$ 422 may correspond to rectified voltage $V_{RECT}$ 122, and EMI filter 440 coupled between current limiter circuit 430 and the power converter (not shown) may correspond to EMI filter 140. EMI filter 440 may include resistors $R_1$, $R_2$, inductors $L_1$, $L_2$, and capacitors $C_2$, $C_3$. As further shown, current limiter circuit 430 may include a surge control circuit 432, a damper control circuit 434, and a switchable resistor circuit 436.

In the depicted example, switchable resistor circuit 436 may be coupled between the limiter input and the limiter output. More particularly, switchable resistor circuit 436 may be coupled between terminal 413 and the power converter (not shown), which may also be referred to as the low-side, and may include an input 480 coupled to both damper control circuit 434 and surge control circuit 432. As further shown, switchable resistor circuit 436 may include a resistor $R_9$ 476 coupled between the limiter input and the limiter output, and a transistor $Q_3$ 474 as a switch coupled across resistor $R_9$ 476 that has a control terminal coupled to input 480. In one example, transistor $Q_3$ 474 is an n-channel MOSFET and the control terminal corresponds to the gate terminal of the MOSFET. In operation, transistor $Q_3$ 474 may vary the impedance between the limiter input and the limiter output (and thus, between the limiter input and the power converter (not shown)) by turning on or off in response to the voltage at input 480. Specifically, when the voltage at input 480 is below a control threshold, transistor $Q_3$ 474 may be turned off and may not conduct current. Therefore, the impedance between the limiter input and the limiter output may be substantially equal to the resistance of resistor $R_9$ 476. However, when the voltage at input 480 becomes equal to or greater than the control threshold, transistor $Q_3$ 474 may turn on and begin conducting current, thereby shorting the resistor $R_9$ 476 and making the impedance between the limiter input and the limiter output substantially zero ohms or approximately zero ohms. As further illustrated, a zener unit $VR_2$ 472 may be coupled between the control terminal 480 and terminal 413 to clamp the voltage at the control terminal to a certain level with respect to terminal 413. Zener unit $VR_2$ 472 may include one or more zener diodes depending on the voltage level desired at the control terminal.

As further shown in FIG. 4, surge control circuit 432 may include a resistive divider comprising resistors $R_3$ 450, $R_4$ 452, and $R_5$ 454 that are coupled between terminals 411 and 413. As shown, the end of resistor $R_5$ 454 coupled to resistor $R_4$ 452 may also be coupled to a zener unit $VR_1$ 456, which is further coupled to a control terminal of a transistor $Q_2$ 458 coupled between input 480 and terminal 413. In one example, transistor $Q_2$ 458 may be an npn BJT and the control terminal of transistor $Q_2$ 458 may correspond to the base terminal of the npn BJT. It should be noted that other transistor types, such as a MOSFET, may also be used. In the depicted example, the voltage across resistor $R_5$ 454 may represent a scaled version of rectified voltage $V_{RECT}$ 422 (e.g., rectified voltage $V_{RECT}$ 422 multiplied by a scaling factor) produced by the resistive divider. In one example, the voltage across resistor $R_5$ 454 may be equal to the rectified voltage $V_{RECT}$ 422 multiplied by the ratio of the resistance of resistor $R_5$ 454 to the sum of the resistances of resistors $R_3$ 450, $R_4$ 452, and $R_5$ 454.

In operation, surge control circuit 432 may adjust the voltage at input 480 in response to the voltage across resistor $R_5$ 454. Specifically, when the voltage across resistor $R_5$ 454 is less than the sum of the turn-on voltage of transistor $Q_2$ 458 and the breakdown voltage of zener unit $VR_1$ 456, transistor $Q_2$ 458 may be turned off and the voltage at input 480 may be at a level that causes switchable resistor circuit 436 to maintain the impedance between the limiter input and the limiter output at substantially zero ohms. When the voltage across resistor $R_5$ 454 becomes equal to or greater than the sum of the turn-on voltage of transistor $Q_2$ 458 and the breakdown voltage of zener unit $VR_1$ 456, transistor $Q_2$ 458 may turn on and begin conducting current, thereby pulling down the voltage at input 480. The voltage at input 480 may then drop to a level that causes switchable resistor circuit 436 to change the impedance between the limiter input and the limiter output to a higher value, such as the resistance of resistor $R_9$ 476. In other words, when rectified voltage $V_{RECT}$ 422 reaches a surge threshold (e.g., in response to a surge in line voltage $V_{AC}$ 102), a value that may be defined as the sum of the breakdown voltage of zener unit $VR_1$ 456 and the turn-on voltage of transistor $Q_2$ 458 divided by the scaling factor of the resistive divider, surge control circuit 432 may adjust the voltage at input 480 to a value that causes switchable resistor circuit 436 to vary the impedance between the limiter input and the limiter output from a lower value to a higher value to reduce the amount of current that the power converter (not shown) would otherwise receive. In this manner, current limiter circuit 430 may provide protection for power conversion system 100 against unexpected surges in line voltage $V_{AC}$ 102. It should be noted that the surge threshold may be set to any desired value by configuring the resistive divider and/or zener unit $VR_1$ 456. For example, the number of zener diodes in zener unit $VR_1$ 456 may be changed and/or the scaling factor of the resistive divider may be set to a different value to increase or decrease the surge threshold.

In the example current limiter circuit 430, damper control circuit 434 includes a resistive divider comprising resistors $R_6$ 460, $R_7$ 462, and $R_8$ 464 coupled to the limiter input between an input terminal 433 and terminal 413. In one example, input terminal 433 corresponds to an input terminal of damper control circuit 434 and is coupled to terminal 411 to receive rectified voltage $V_{RECT}$ 422. In operation, the resistive divider produces a scaled version of rectified voltage $V_{RECT}$ 422 across resistor $R_8$ 464. In one example, the voltage across resistor $R_8$ 464 is substantially equal to rectified voltage $V_{RECT}$ 422 multiplied by the ratio of resistor $R_8$ 464 to the sum of resistors $R_6$ 460, $R_7$ 462, and $R_8$ 464. As shown, the end of resistor $R_8$ 464 that is coupled to resistor $R_7$ 462 may also be coupled to a diode $D_1$ 466 and to a control terminal of transistor $Q_1$ 468. In one example, transistor $Q_1$ 468 is a pnp BJT and the control terminal corresponds to the base terminal of transistor $Q_1$ 468. Both diode $D_1$ 466 and transistor $Q_1$ 468 may be further coupled to input 480. In the depicted example, damper control circuit 434 also includes a capacitor $C_1$ 470 coupled between input 480 and terminal 413.

During the operation of damper control circuit 434, at the time that dimmer circuit 110 switches on, capacitor $C_1$ 470 may be uncharged and the voltage at input 480 may be below the control threshold, causing switchable resistor circuit 436 to keep the impedance between the limiter input and the limiter output at a higher value, such as the resistance of resistor $R_9$ 476. This may cause current limiter circuit 430 to dampen the input current. As the triac of dimmer circuit 110 continues to conduct current, the voltage on capacitor $C_1$ 470 (and thus, the voltage at input 480) may increase with the charging of capacitor $C_1$ 470 and may reach a damper threshold, which may be a value that causes switchable resistor circuit 436 to decrease the impedance between the limiter input and the limiter output to a lower value, such as zero ohms. This may stop current limiter circuit 430 from dampening the input current. The amount of time that the voltage on capacitor $C_1$ 470 takes to reach damper threshold may depend on the values of resistor $R_6$ 460, resistor $R_7$ 462, and capacitor $C_1$ 470, and as such, may be adjusted by changing those values. In this manner, damper control circuit 434 may adjust the length of time (e.g., the portion of the half line cycle) that current limiter circuit 430 dampens the input current after dimmer circuit 110 switches on.

In the depicted example, diode $D_1$ 466 is coupled between the resistive divider of damper control circuit 434 and input 480 and operates to prevent capacitor $C_1$ 470 from discharging until the voltage on capacitor $C_1$ 470 exceeds the voltage across resistor $R_8$ 464 by the turn-on voltage of transistor $Q_1$ 468. In other words, when the voltage across resistor $R_8$ 464 drops in response to following rectified voltage $V_{RECT}$ 422 during the half line cycle and reaches a certain level such that the difference between the voltage on capacitor $C_1$ 470 and the voltage across resistor $R_8$ 464 becomes equal to or greater than the turn-on voltage of transistor $Q_1$ 468, transistor $Q_1$ 468 turns on and begins conducting current, causing capacitor $C_1$ 470 to discharge. In this way, damper control circuit 434 may fully discharge capacitor $C_1$ 470 before the start of the next half line cycle and thus may ensure that the time that the voltage on capacitor $C_1$ 470 takes to reach the damper threshold is substantially the same in each half line cycle.

Figure 5:
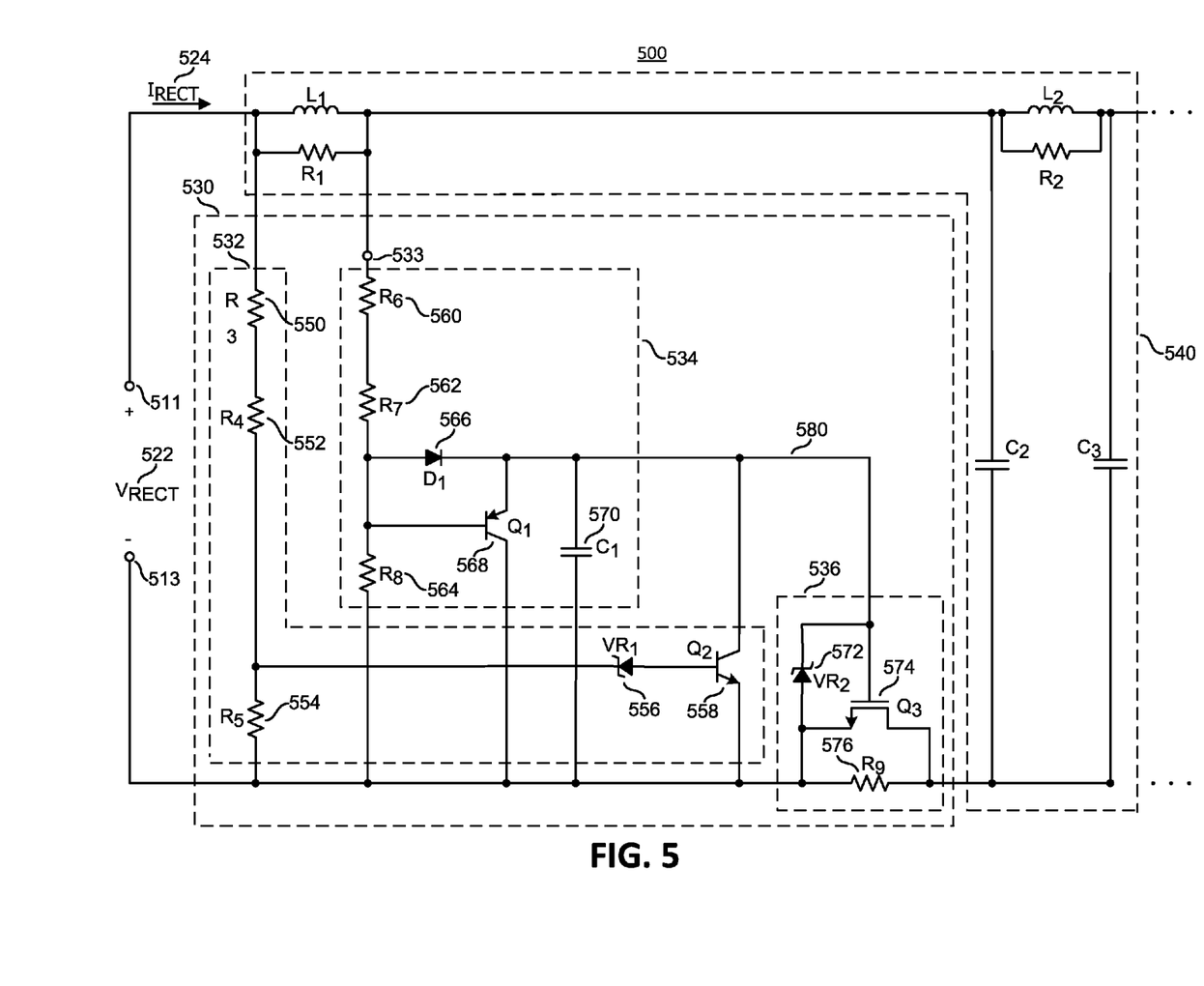
FIG. 5 shows a circuit diagram illustrating another example current limiter circuit.

FIG. 5 shows a circuit diagram 500 illustrating another example current limiter circuit 530 that can be used in power conversion system 100. Similarly numbered and named elements in FIG. 5 can be coupled together and function in a manner similar or identical to that described above with respect to FIG. 4. For example, elements 511, 513, 522, 524, 532, 533, 534, 536, 540, 550, 552, 554, 556, 558, 560, 562, 564, 566, 568, 570, 572, 574, 576, and 580 of FIG. 5 may correspond to elements 411, 413, 422, 424, 432, 433, 434, 436, 440, 450, 452, 454, 456, 458, 460, 462, 464, 466, 468, 470, 472, 474, 476, and 480 of FIG. 4. Current limited circuit 530 may be similar to current limited circuit 430, except that damper control circuit 534 may be coupled, via terminal 533, to one of the internal nodes of EMI filter 540 rather than one of the input terminals (e.g., terminal 511). As illustrated, EMI filter 540 may include a low-pass filter comprising an inductor $L_1$ coupled across a resistor $R_1$ that is coupled to receive rectified voltage $V_{RECT}$ 522 from terminal 511. The low-pass filter may be further coupled to provide a filtered version of rectified voltage $V_{RECT}$ 522 to input terminal 533. In this manner, the low-pass filter may reduce the noise in rectified voltage $V_{RECT}$ 522 and thus smooth the signal that is provided to input terminal 533 of damper control circuit 534.

Figure 6:
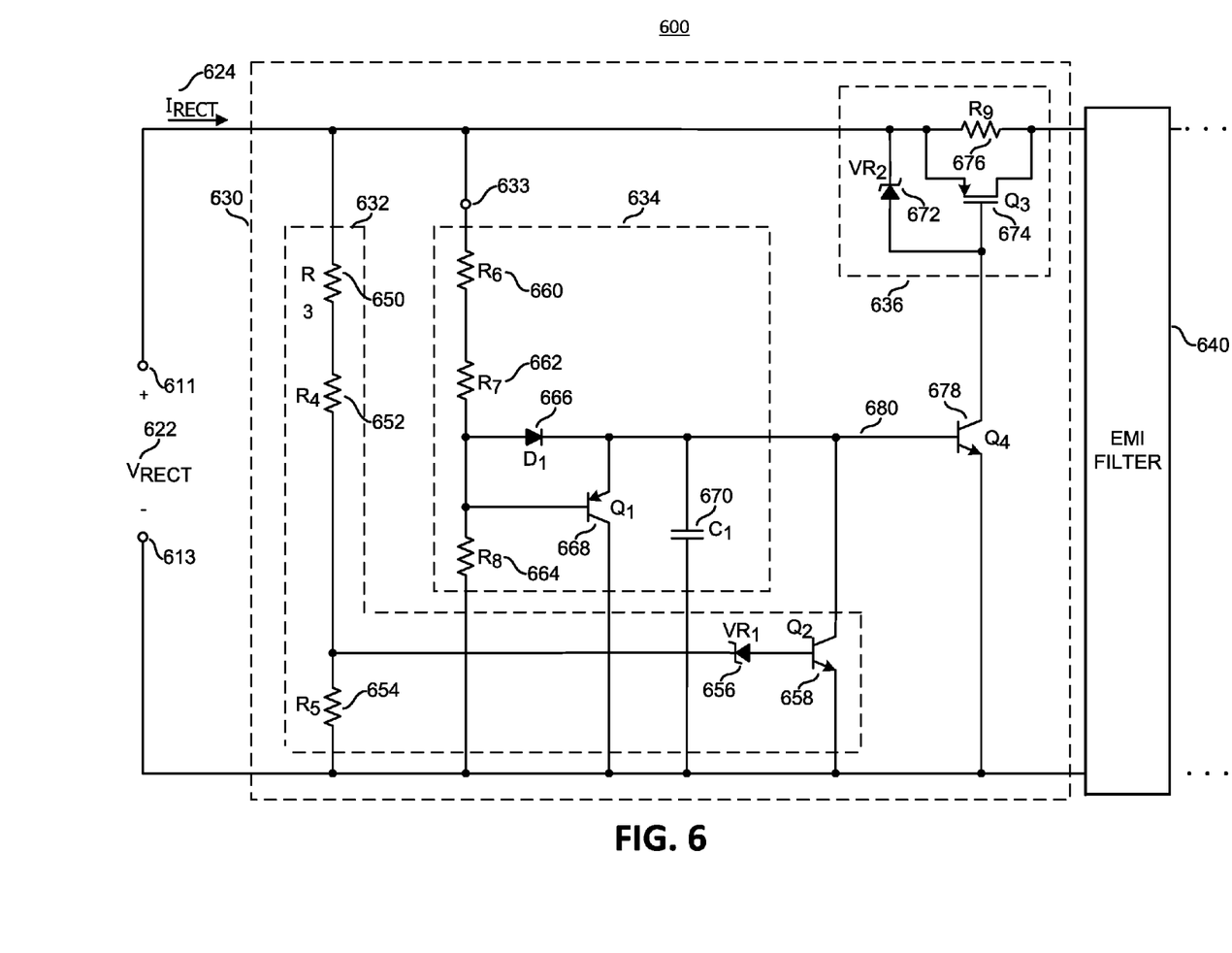
FIG. 6 shows a circuit diagram illustrating yet another example current limiter circuit.

FIG. 6 shows a circuit diagram 600 illustrating another example current limiter circuit 630 that can be used in power conversion system 100. Similarly numbered and named elements in FIG. 6 can be coupled together and function in a manner similar or identical to that described above with respect to FIG. 4. For example, elements 611, 613, 622, 624, 632, 633, 634, 636, 640, 650, 652, 654, 656, 658, 660, 662, 664, 666, 668, 670, 672, 674, 676, and 680 of FIG. 6 may correspond to elements 411, 413, 422, 424, 432, 433, 434, 436, 440, 450, 452, 454, 456, 458, 460, 462, 464, 466, 468, 470, 472, 474, 476, and 480 of FIG. 4. Current limiter circuit 630 may be similar to current limiter circuit 430, except that switchable resistor circuit 636 may be coupled between terminal 611 and the power converter (not shown), which may also be referred to as a high-side, rather than coupled to the low-side. Switchable resistor circuit 636 may also include a p-channel MOSFET for transistor $Q_3$ 674 as shown rather than an n-channel MOSFET as used for transistor $Q_3$ 474. In one example, switchable resistor circuit 636 may include a resistor (not shown) coupled between the drain terminal and the gate terminal of transistor $Q_3$ 674 to help with transitioning transistor $Q_3$ 674 from the on state to the off state. Current limiter circuit 630 may also include an additional transistor $Q_4$ 678 coupled between an output 680 and the input of switchable resistor circuit 636. In the depicted example, output 680 corresponds to both the output of damper control circuit 634 and the output of surge control circuit 632, which are coupled together. In one example, transistor $Q_4$ 678 may include an npn BJT and its collector terminal may be coupled to the input of switchable resistor circuit 636, its base terminal may be coupled to output 680, and its emitter terminal may be coupled to terminal 613. In another example, transistor $Q_4$ 678 may include a MOSFET.

In the example current limiter circuit, surge control circuit 632, damper control circuit 634, and switchable resistor circuit 636 may operate in a manner similar to the corresponding circuits of current limiter circuit 430, discussed above. That is, surge control circuit 632 may adjust the signal at output 680 to transition transistor $Q_4$ 678 from an on state to an off state in response to determining that rectified voltage $V_{RECT}$ 622 has reached a surge threshold, thereby causing switchable resistor circuit 636 to change the impedance between the limiter input and the limiter output from a lower value to a higher value in the event of a surge in the line. Damper control circuit 634 may adjust the signal at output 680 to operate transistor $Q_4$ 674 in the off state for a certain length of time (e.g., from when dimmer circuit 110 switches on until damper control circuit 634 determines that rectified voltage $V_{RECT}$ 622 has reached a damper threshold) and then transitions transistor $Q_4$ 678 to the on state for the rest of the half line cycle. By doing this, damper control circuit 634 causes switchable resistor circuit 636 to increase the impedance between the limiter input and the limiter output to a higher value for a portion of the half line cycle and to decrease the impedance between the limiter input and the limiter output to a lower value for the remainder of the half line cycle.

The above description of illustrated examples of the present invention, including what is described in the Abstract, are not intended to be exhaustive or to be a limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A current limiter circuit comprising:
   an input to be coupled to receive an input signal representative of a rectified line voltage;
   a variable impedance circuit coupled between the input and an output of the current limiter circuit, wherein an impedance of the variable impedance circuit is varied in response to a control signal;
   a surge control circuit coupled to the input to sense a surge in the input signal and to increase the impedance of the variable impedance circuit by adjusting the control signal in response to the surge; and
   a damper control circuit coupled to adjust the control signal such that the impedance of the variable impedance circuit is increased for a portion of a period of the input signal and is decreased for a remainder of the period of the input signal, wherein the portion of the period of the input signal is less than the period of the input signal.

2. The current limiter circuit of claim 1, wherein the variable impedance circuit comprises:
   an impedance element; and
   a switch coupled across the impedance element and coupled to receive the control signal, wherein the switch is configured turn on or turn off in response to the control signal.

3. The current limiter circuit of claim 2, wherein the switch is a MOSFET.

4. The current limiter circuit of claim 2, wherein the surge control circuit is configured to adjust the control signal to cause the switch to turn off in response to the input signal being greater than a threshold value that is representative of the surge in the input signal.

5. The current limiter circuit of claim 2, wherein the damper control circuit comprises:
   a resistive divider circuit coupled to receive the input signal, wherein the resistive divider circuit is configured to output a scaled signal that is a scaled version of the input signal;
   a capacitor coupled to receive the scaled signal, wherein the control signal comprises a voltage across the capacitor, and wherein the switch is configured to turn on in response to the scaled signal charging the capacitor to cause the voltage across the capacitor to be greater than a threshold value; and
   a transistor coupled across the capacitor, wherein the transistor is configured transition to an ON state to discharge the capacitor in response to a difference between the scaled signal and the voltage across the capacitor being less than a second threshold value.

6. The current limiter circuit of claim 5, wherein the surge control circuit comprises:
   a second resistive divider circuit coupled to receive the input signal, wherein the second resistive divider circuit is configured to output a second scaled signal that is a scaled version of the input signal; and
   a second transistor coupled across the capacitor, wherein the second transistor is configured to transition to an ON state to discharge the capacitor in response to the second scaled signal being greater than a third threshold value.

7. A power conversion system comprising:
   a rectifier to be coupled to receive a truncated line voltage and to produce a rectified signal therefrom;
   a current limiter circuit comprising an input coupled to the rectifier to receive the rectified signal, the current limiter comprising:
     a variable impedance circuit coupled between the input and an output of the current limiter circuit,
     a surge control circuit coupled to sense a surge in the rectified signal and increase an impedance of the variable impedance circuit in response to the surge; and
     a damper control circuit coupled to increase the impedance of the variable impedance circuit to cause the power conversion system to draw at least a holding current of a dimmer circuit that outputs the truncated line voltage for a portion of a period of the rectified signal, wherein the portion of the period of the rectified signal is less than the period of the rectified signal; and
   a power converter coupled to the output of the current limiter circuit.

8. The power conversion system of claim 7, wherein the variable impedance circuit comprises a single input coupled to the surge control circuit and the damper control circuit.

9. The power conversion system of claim 8, wherein the variable impedance circuit comprises:
an impedance element; and
a switch coupled across the impedance element, wherein the switch is configured to turn on or turn off in response to a voltage on the single input.

10. The power conversion system of claim 9, wherein the switch is a MOSFET.

11. The power conversion system of claim 9, wherein the surge control circuit is configured to adjust the voltage on the single input to cause the switch to turn off in response to the rectified signal being greater than a threshold value that is representative of the surge in the rectified signal.

12. The power conversion system of claim 9, wherein the damper control circuit comprises:
a resistive divider circuit coupled to receive the rectified signal, wherein the resistive divider circuit is configured to output a scaled signal that is a scaled version of the rectified signal;
a capacitor coupled to receive the scaled signal, wherein the voltage on the single input comprises a voltage across the capacitor, and wherein the switch is configured to turn on in response to the scaled signal charging the capacitor to cause the voltage across the capacitor to be greater than a threshold value; and
a transistor coupled across the capacitor, wherein the transistor is configured transition to an ON state to discharge the capacitor in response to a difference between the scaled signal and the voltage across the capacitor being less than a second threshold value.

13. The power conversion system of claim 12, wherein the surge control circuit comprises:
a second resistive divider circuit coupled to receive the rectified signal, wherein the second resistive divider circuit is configured to output a second scaled signal that is a scaled version of the rectified signal; and
a second transistor coupled across the capacitor, wherein the second transistor is configured to transition to an ON state to discharge the capacitor in response to the second scaled signal being greater than a third threshold value.

14. The power conversion system of claim 7, further comprising a filter circuit coupled between the current limiter circuit and the power converter.

15. The power conversion system of claim 14, wherein the damper control circuit is coupled to receive a filtered version of the rectified signal from the filter circuit, and wherein the damper control circuit is configured to increase the impedance of the variable impedance circuit based on the filtered version of the rectified signal.

16. The power conversion system of claim 7, wherein the variable impedance circuit is coupled to a low-side of the power converter.

17. The power conversion system of claim 7, wherein the variable impedance circuit is coupled to a high-side of the power converter.

18. The power conversion system of claim 7, wherein the power conversion system is a light-emitting diode (LED) driver, and wherein an output of the power converter is coupled to one or more LEDs.

19. A device comprising:
a variable impedance circuit to be coupled to an input of a power converter supplied by a line, the variable impedance circuit including a single input coupled to:
a surge control circuit coupled to sense a surge in the line supplying the power converter and to increase an impedance of the variable impedance circuit in response to the surge; and
a damper control circuit coupled to dampen oscillations in a current into the power converter by increasing the impedance of the variable impedance circuit for a portion of a half cycle of a line voltage on the line supplying the power converter, wherein the portion of the half cycle of the line voltage is less than the half cycle of the line voltage.

20. The device of claim 19, wherein the variable impedance circuit comprises:
an impedance element; and
a switch coupled across the impedance element and coupled to receive a voltage on the single input, wherein the switch is configured to turn on or turn off in response to the voltage on the single input.

21. The device of claim 20, wherein the switch is a MOSFET.

22. The device of claim 20, wherein the surge control circuit is configured to adjust the voltage on the single input to cause the switch to turn off in response to the line voltage being greater than a threshold value that is representative of the surge in the line supplying the power converter.

23. The device of claim 20, wherein the damper control circuit comprises:
a resistive divider circuit coupled to receive a signal that is representative of the line voltage, wherein the resistive divider circuit is configured to output a scaled signal that is a scaled version of the signal that is representative of the line voltage;
a capacitor coupled to receive the scaled signal, wherein the voltage on the single input comprises a voltage across the capacitor, and wherein the switch is configured to turn on in response to the scaled signal charging the capacitor to cause the voltage across the capacitor to be greater than a threshold value; and
a transistor coupled across the capacitor, wherein the transistor is configured transition to an ON state to discharge the capacitor in response to a difference between the scaled signal and the voltage across the capacitor being less than a second threshold value.

24. The device of claim 23, wherein the surge control circuit comprises:
a second resistive divider circuit coupled to receive the signal that is representative of the line voltage, wherein the second resistive divider circuit is configured to output a second scaled signal that is a scaled version of the signal that is representative of the line voltage; and
a second transistor coupled across the capacitor, wherein the second transistor is configured to transition to an ON state to discharge the capacitor in response to the second scaled signal being greater than a third threshold value.

* * * * *